Patented June 3, 1952

2,599,482

UNITED STATES PATENT OFFICE 2,599,482

SEPARATION OF PRODUCTS OBTAINED FROM ISOBUTYLENE-NITROSYL CHLORIDE ADDUCT

Erhard John Prill, Cresskill, N. J., assignor to Allied Chemical & Dye Corporation, New York, N. Y., a corporation of New York No Drawing. Application July 29, 1948, Serial No. 41,393

3 Claims. (Cl. 202—42)

This invention relates to the purification of products of the dehydrochlorination and dehydration of the normally solid isobutylene-nitrosyl chloride adduct. In particular it relates to the purification of the nitriles formed in the above dehydrochlorination-dehydration reaction and especially to the separation in purified form of methacrylonitrile from the products of the above mentioned reaction. Reaction mixtures of the types referred to herein are obtained in accordance with the processes of my copending applications Serial Nos. 41,391, now abandoned, and 41,392, and 41,395, now Patent Numbers 2,528,708 and 2,553,331, respectively, all filed July 29, 1948.

The isobutylene-nitrosyl chloride adduct referred to herein is the solid adduct, probably a bis-nitroso form of 2-methyl-1-chloro-2-nitrosopropane, formed by reaction of isobutylene and nitrosyl chloride as described for example by Crowder et al. U. S. Patent 2,394,430 of February 5, 1946. The pure compound melts at about 104° C.

The combined dehydrochlorination and dehydration of this isobutylene-nitrosyl chloride adduct produce a reaction mixture in which the main products derived from the adduct are methacrylonitrile and alpha-chlorisobutyronitrile in relative proportions depending on the nature and proportions of dehydrochlorination and dehydration agents employed. Other components of the mixture are products derived from the dehydrochlorinating agent and from the dehydrating agent. By-products such as methacrolein, formed from the adduct, are also present. The separation of this reaction mixture into pure components presents a difficult technical problem which is not solved entirely satisfactorily by straight fractional distillation.

It is an object of my invention to provide an efficient process for separating the above two nitriles from each other and from other components of the above described reaction mixture.

Another object is to provide an efficient process for separating all the individual constituents of the above described mixtures of products containing methacrylonitrile and alpha-chlorisobutyronitrile.

Still another object is to provide a single azeotropic agent which is effective throughout the separation of reaction mixtures such as described above containing methacrylonitrile, so that by addition of a single agent the distillation temperatures required to separate each component may be substantially reduced from their normal values.

Other objects and advantages will appear more fully hereinafter.

I have found that the products of the dehydrochlorination-dehydration of isobutylene-nitrosyl chloride adduct may advantageously be separated one from any or all of the others by azeotropically distilling the mixture of products with water as the azeotropic agent. More specifically, I have found the nitriles methacrylonitrile and alpha-chlorisobutyronitrile may advantageously be separated as their aqueous azeotropes from each other as well as from any other products of the above dehydrochlorination-dehydration such as methacrolein and the reaction products generated from the dehydrochlorinating and the dehydrating agent.

I have found that the pure methacrylonitrile-water azeotrope boils at about 76.5° C. at atmospheric pressure and contains about 84% by weight of methacrylonitrile and about 16% by weight of water. The azeotrope of methacrylonitrile separates from the azeotrope of alpha-chlorisobutyronitrile on fractionation, e. g. in a column of 10 theoretical plates, leaving behind only a relatively small quantity of methacrylonitrile in the higher boiling intermediate fraction. On cooling, the aqueous methacrylonitrile azeotrope forms an aqueous and an organic layer. The organic layer may be separated and the aqueous layer, containing a little dissolved nitrile, may be returned to the still.

I have found the alpha-chlorisobutyronitrile originally in admixture with methacrylonitrile forms a small intermediate fraction, and an aqueous azeotrope boiling at about 87° C. at atmospheric pressure. This azeotrope contains about 78% by weight of alpha-chlorisobutyronitrile and 22% by weight of water. Like the aqueous methacrylonitrile azeotrope it separates into an aqueous and an organic layer on cooling. Alpha-chlorisobutyronitrile in the intermediate fraction may be recovered in pure form by redistillation of this fraction, suitably in the presence of water.

The azeotrope of methacrolein and water boils at 63.9° C., I have found. From a mixture containing methacrylonitrile and methacrolein the methacrolein-water azeotrope may be taken off as a separate fraction. Any methacrolein which comes off subsequently with the methacrylonitrile fraction may be removed by a second fractionation of the methacrylonitrile fraction to leave substantially pure methacrylonitrile.

My process is of particular advantage in recovering the nitriles produced by a dehydrochlorination-dehydration of isobutylene-nitrosyl chloride adduct effected in the presence of acetic anhydride and a dehydrochlorinating agent. The normal boiling points of alpha-chlorisobutyronitrile (116° C.) and of the acetic acid generated from the acetic anhydride (118° C.) are very close; hence when acetic anhydride is employed as the dehydrating agent of isobutylene-nitrosyl chloride adduct a problem of separating the nitriles formed, particularly the alpha-chlorisobutyronitrile, from acetic acid is presented. In the presence of water, both the nitriles produced on dehydrochlorination-dehydration of isobutylene-nitrosyl chloride adduct with acetic anhydride as the dehydrating agent are easily separated from the acetic acid generated in the reaction, by fractionating the mixture of reaction products; and are likewise readily separated, in presence of water, from each other and from various impurities in the reaction product.

The following example illustrates my invention but is not intended to limit the scope of the invention:

To a mixture of products obtained by dehydrochlorinating and dehydrating the solid adduct of isobutylene and nitrosyl chloride in the presence of acetic anhydride and quinoline and distilling out a reaction product which contained methacrylonitrile, alpha-chlorisobutyronitrile, methacrolein and acetic acid, a quantity of water and about 0.5% by weight of hydroquinone as a polymerization inhibitor were added. The products were fractionated through a column of about 10 theoretical plates fitted with an azeotropic head. The forerunnings up to 73° C. were taken off and then a fraction boiling 73–77° C. was collected. The lower layer separated in the azeotropic head was the aqueous layer and was returned to the column. The organic layer was collected. The organic layers from the fractions which came off from 77° to 99° C. were then separately collected.

The organic layer of the first fraction (73–77° C.) contained about 96% by weight of methacrylonitrile, 2% of methacrolein and 2% water and was free of alpha-chlorisobutyronitrile. Analysis for total nitriles was by nitrogen determination (Kjeldahl method); for alpha-chlorisobutyronitrile was by chlorine determination (Parr method); and for methacrolein was by hydroxylamine titration. Methacrylonitrile saturated with water contains about 2% of water.

The methacrylonitrile was dried over substantially anhydrous calcium sulfate and further purified by a redistillation to give a fraction which was the higher boiling 90% of the organic layer from the 73–77° fraction above and was methacrylonitrile of a purity of 98.5% as indicated by nitrogen determination and boiling point.

The collected organic layers of the 77°–99° fractions analyzed as above contained about 33% by weight of methacrylonitrile, 63% by weight alpha-chlorisobutyronitrile, the remaining 1% chiefly water and acetic acid.

The composition of the aqueous azeotrope taken off as distillate in my process is independent of the quantity of water present in the still so long as some water remains present. Accordingly, it is not essential in my process that any particular quantity of water be added to the mixture to be separated; it is only necessary that water be present throughout the distillation. A certain amount of water dissolves in the organic layers which separate on condensing the azeotropes distilling over in my process. This water is removed from the distillation system when the organic layers are collected. Hence, the total amount of water added to the still in my process is at least enough to saturate all of the organic distillate at the temperature at which the organic layers of the distillates are separated from the aqueous layers of the distillates. All the water used may be added at the start or water may be added during the course of the distillation. An excess of water does no particular harm.

Since my process as illustrated in the above example separates each of the products of the dehydrochlorination-dehydration of isobutylene-nitrosyl chloride adduct from the others, it is evident that my process is applicable whenever any mixture containing two or more of the products shown in the example is to be separated into one or more purified components.

Although a batch distillation is illustrated in the example, it is possible to employ continuous distillation methods in carrying out my process.

I claim:

1. A process for the separation in purified form of at least one of the components of the mixture of products formed when isobutylene-nitrosyl chloride adduct is dehydrochlorinated and dehydrated, which process comprises adding water to said mixture to be separated and fractionating the aqueous mixture thus obtained, distilling off at least the methacrolein component and substantially all of the methacrylonitrile component as their aqueous azeotropes, and throughout the period of distillation maintaining water present in the mixture of products undergoing separation.

2. A process for the separation of methacrylonitrile and alpha-chlorisobutyronitrile from the mixture of products obtained when isobutylene-nitrosyl chloride adduct is dehydrochlorinated and dehydrated in the presence of acetic anhydride and quinoline dehydrochlorinating agent, which process comprises adding water to the mixture of reaction products, fractionating the resulting aqueous mixture of products at atmospheric pressure, separating the fraction coming off at about 73–77° C. into an aqueous and an organic layer, returning the aqueous layer to the distillation system and collecting the organic layer, and separately collecting distillate coming off within the range between about 77° and 99° C.

3. A process in accordance with claim 2 in which the organic layer of the 73°–77° C. fraction is redistilled to separate methacrylonitrile from impurities in this layer.

ERHARD JOHN PRILL.

REFERENCES CITED

The following references are of record in the file of this patent:

UNITED STATES PATENTS

| Number | Name | Date |
|---|---|---|
| 2,174,756 | Pieroh | Oct. 3, 1939 |
| 2,175,810 | Loder | Oct. 10, 1939 |
| 2,210,320 | Kautter | Aug. 6, 1940 |
| 2,415,662 | Teter | Feb. 11, 1947 |
| 2,471,928 | Bortnick et al. | May 31, 1949 |